United States Patent
Yamada et al.

(10) Patent No.: US 8,364,890 B2
(45) Date of Patent: Jan. 29, 2013

(54) RAID CONTROL APPARATUS AND CONTROL METHOD THEREFOR

(75) Inventors: Hidenori Yamada, Kawasaki (JP); Akihito Kobayashi, Kawasaki (JP); Katsuhiko Nagashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 857 days.

(21) Appl. No.: 12/027,459

(22) Filed: Feb. 7, 2008

(65) Prior Publication Data
US 2008/0215810 A1  Sep. 4, 2008

(30) Foreign Application Priority Data
Feb. 7, 2007  (JP) .................................. 2007-27548

(51) Int. Cl.
*G06F 12/00* (2006.01)
(52) U.S. Cl. ........................................ 711/113; 711/114
(58) Field of Classification Search .................... 711/113
See application file for complete search history.

(56) References Cited

U.S. PATENT DOCUMENTS

| | | | |
|---|---|---|---|
| 6,880,059 B2 | 4/2005 | Mizuno et al. | |
| 6,950,920 B1 | 9/2005 | Mizuno et al. | |
| 2002/0133735 A1 * | 9/2002 | McKean et al. | 714/5 |

FOREIGN PATENT DOCUMENTS

| | | |
|---|---|---|
| JP | 11-312058 | 11/1999 |
| JP | 2003-162377 | 6/2003 |
| JP | 2003-167678 | 6/2003 |

* cited by examiner

*Primary Examiner* — John Lane
(74) *Attorney, Agent, or Firm* — Staas & Halsey LLP (57) ABSTRACT

A RAID control apparatus and control method. The RAID control apparatus includes disk devices and disk control devices including a cache memory that stores cache data of a logical unit, and control unit, upon the logical units present in different disk devices being concatenated to each other, switching in-charge disk control devices such that a disk control device is in charge of access to the concatenated logical units without writing back the cache data stored in a cache memory of a source disk control device to the disk device.

11 Claims, 8 Drawing Sheets

CONFIGURATION INFORMATION
BEFORE LU CONCATENATION     21a

| LU NUMBER | IN-CHARGE CM | RAID GROUP |
|---|---|---|
| LUN 0 | CM0 | 0 |
| LUN 1 | CM0 | 0 |
| LUN 2 | CM0 | 0 |
| LUN 3 | CM1 | 1 |
| LUN 4 | CM1 | 1 |
| LUN 5 | CM1 | 1 |

FIG. 3B

CONFIGURATION INFORMATION
AFTER LU CONCATENATION     21b

| LU NUMBER | IN-CHARGE CM | RAID GROUP |
|---|---|---|
| LUN 0 | CM0 | 0 |
| LUN 1 | CM0 | 0 |
| LUN 2 | CM0 | 0 |
| LUN 3 | CM0 | 1 |
| LUN 4 | CM0 | 1 |
| LUN 5 | CM1 | 1 |

RAID CONTROL APPARATUS AND CONTROL METHOD THEREFOR

CROSS-REFERENCE TO RELATED APPLICATIONS

This application is related to and claims the benefit of priority from Japanese Patent Application No. 2007-27548, filed on Feb. 7, 2007, the entire contents of which are incorporated herein by reference.

BACKGROUND

1. Field of the Invention

The present invention relates to a RAID apparatus and a control method therefor.

2. Description of the Related Art

A disk array system includes a plurality of disk devices and one disk control device or a plurality of disk control devices. Systems each having the plurality of disk control devices include a system in which a disk device in charge of access is predetermined.

A known function which dynamically enlarges a capacitance of a logical unit (LU) is an LU concatenation function. The LU concatenation function not only simply concatenates LUs to each other but also performs stripe concatenation to allocate stripes to another physical disk.

Figure 8:
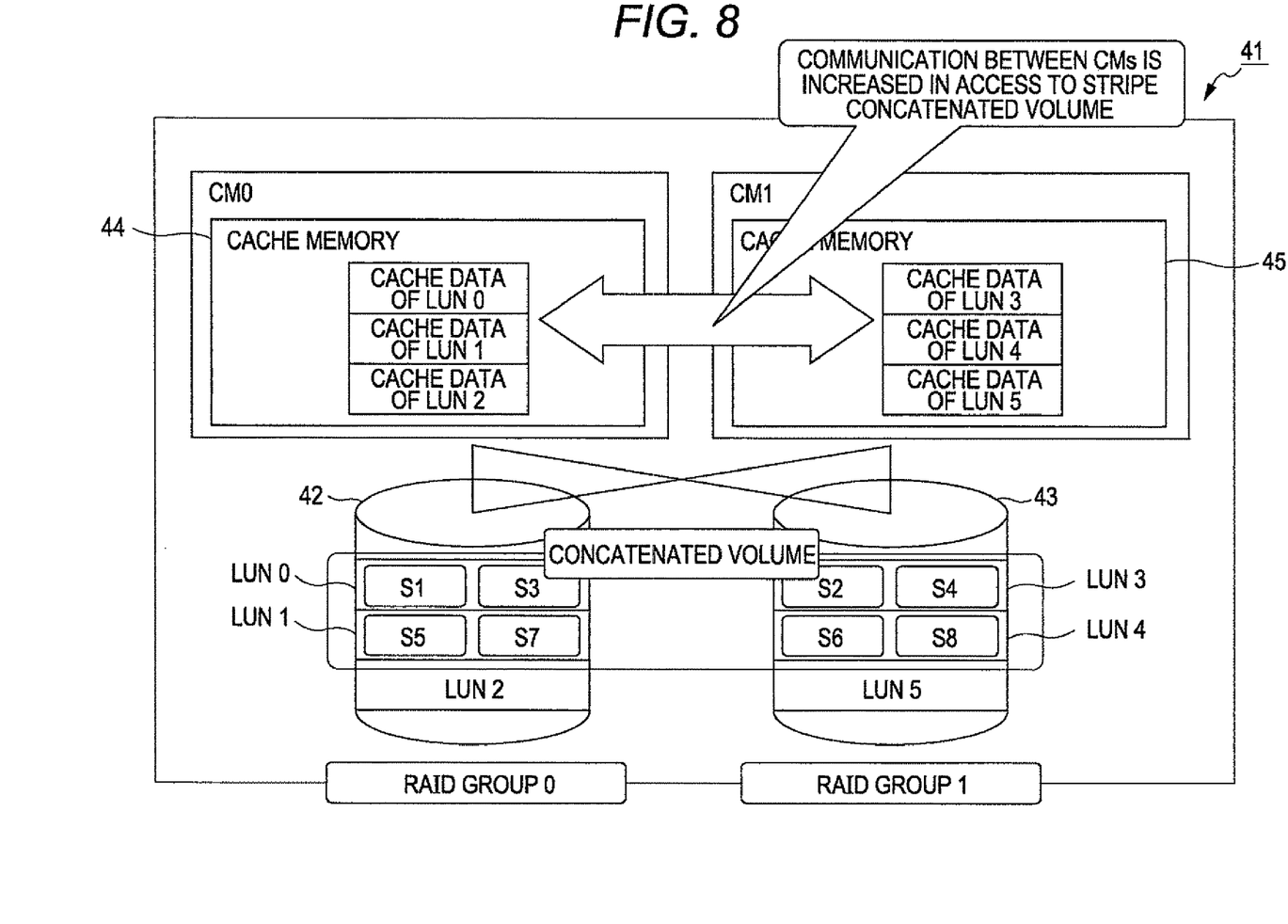
FIG. 8 is a diagram illustrating LU concatenation of a conventional RAID apparatus.

FIG. 8 is a diagram illustrating a conventional RAID apparatus 41 in stripe concatenation. The RAID apparatus 41 includes a plurality of disk devices 42 and 43 and controller modules CM0 and CM1 that are in charge of access to the disk devices 42 and 43. The controller modules CM0 and CM1 have cache memories 44 and 45, respectively.

The controller module CM0 is in charge of access to the disk device 42 of RAID group 0, and the controller module CM1 is in charge of access to the disk device 43 of RAID group 1. In the cache memory 44 of the controller module CM0, for example, cache data of logical units of logical unit numbers LUN0, LUN1, and LUN2 are stored. In the cache memory 45 of the controller module CM1, cache data of logical units of logical unit numbers LUN3, LUN4, and LUN5 are stored.

LU concatenation is performed, and a stripe concatenation volume includes logical units of the logical unit numbers LUN0, LUN1, LUN3, and LUN4. Thereafter, when a host computer (not shown) sends an I/O request to the concatenated volume, stripes S1, S2, S3, S4, S5, S6, S7, and S8 sequentially access the concatenated volume in the order named. At this time, since the cache data of the logical units are stored in the cache memory 44 or 45 of the in-charge controller module CM0 or CM1, communication must be frequently performed between in-charge controller modules of respective RAID groups in an I/O process to the concatenated volume. The capability to access a stripe concatenated volume, in particular, the capability to access to the volume when a cache is hit, is considerably deteriorated.

SUMMARY

An embodiment of the present invention provides a RAID control apparatus that includes a plurality of disk devices and a plurality of disk control devices that include a cache memory that stores cache data of a logical unit, and control unit, upon the plurality of logical units present in different disk devices being concatenated to each other, switching in-charge disk control devices such that a disk control device is in charge of access to the plurality of concatenated logical units without writing back the cache data stored in a cache memory of a source disk control device to the disk device.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments, examples of which are illustrated in the accompanying drawings, wherein like reference numerals refer to the like elements throughout. The embodiments are described below to explain the present invention by referring to the figures.

Figure 1:
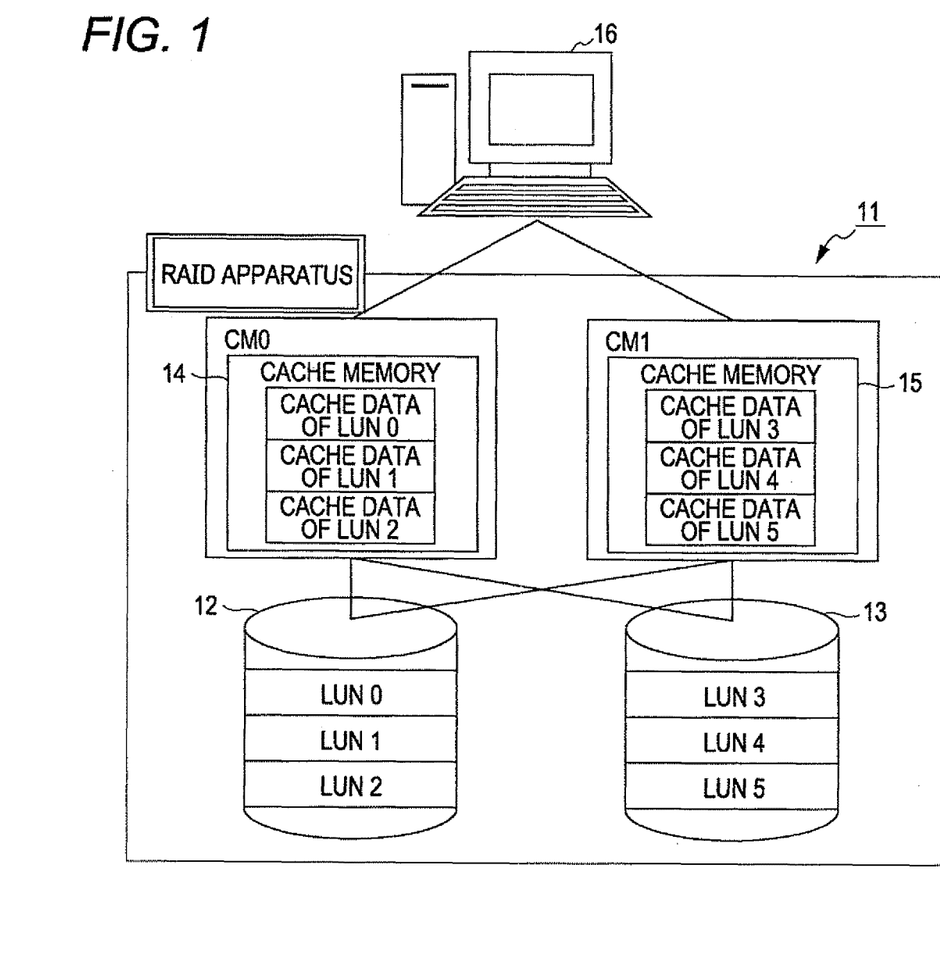
FIG. 1 is a diagram illustrating a configuration of a RAID apparatus according to an embodiment of the invention.

An example embodiment of the present invention will be described below. FIG. 1 is a diagram illustrates a configuration of a RAID apparatus (corresponding to RAID control apparatus) 11 according to an example embodiment.

In FIG. 1, the RAID apparatus 11 includes a controller module CM0 (corresponding to a disk control device) which manages a disk device 12 of RAID group 0, and a controller module CM1 which manages a disk device 13 of RAID group 1. The controller module CM0 has a cache memory 14 which stores cache data, and the controller module CM1 has a cache memory 15 which stores cache data.

Upon receipt of a read request from a host computer 16, the controller module CM0 (or CM1) in charge of a disk device to be accessed determines whether the data is present in the cache memory 14 (or 15). When the data is not present, the controller module CM0 (or CM1) reads data from the disk device 12 (or 13) to write the data in the cache memory 14 (or 15). Upon receipt of a write request from the host computer 16, the controller module CM0 (or CM1) temporarily writes the received data in the cache memory 14 (or 15). Thereafter, the data is written in the disk device 12 (or 13). In a Write Through mode, the received data is simultaneously written in the cache memory 14 (or 15) and the disk device 12 (or 13).

Cache data of the logical units, e.g., logical unit numbers LUN0, LUN1, and LUN3 of the disk device 12 in charge of access are stored in the cache memory 14 of the controller module CM0. Cache data of the logical units, e.g., logical unit numbers LUN3, LUN4, and LUN5 of the disk device 13 in charge of access are stored in the cache memory 15 of the controller module CM1.

An example process operation performed when controller modules in charge of management of disk devices in formation of a stripe concatenated volume are switched will be described below with reference to FIGS. 2 to 4.

Figure 2:
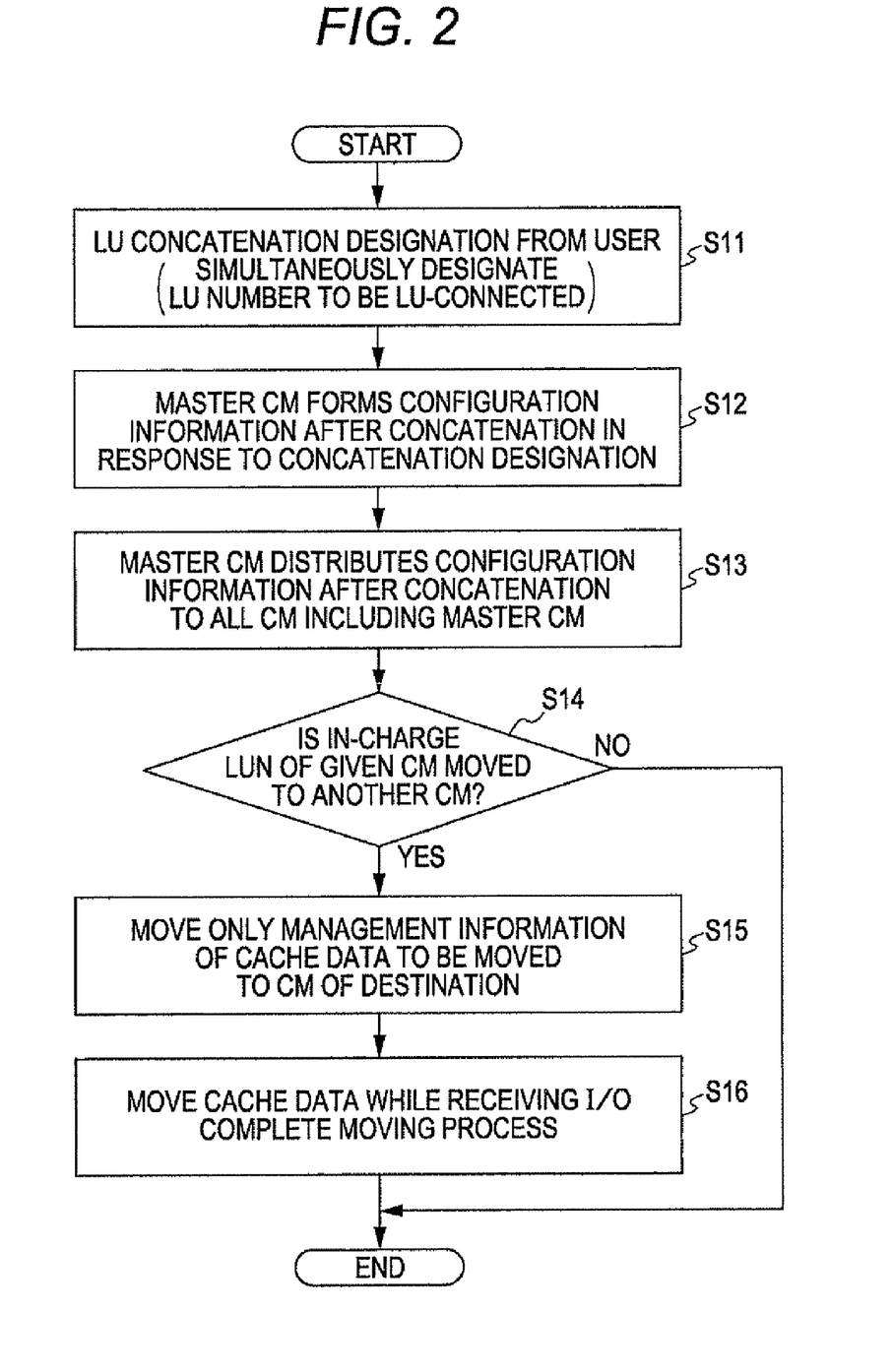
FIG. 2 is a flow chart illustrating a moving process in a stripe concatenation state.

FIG. 2 is a flow chart of an example stripe concatenation process. When a logical unit concatenation (LU concatenation) designation is received from a user (host computer) (S11 in FIG. 2), a master controller module (specific controller module of a plurality of controller modules) that has received the concatenation designation forms configuration information after LU concatenation (S12). The configuration information, as will be described later, includes a logical unit number that specifies a logical unit, information representing a controller module in charge of the logical unit, and information representing a RAID group including the logical unit.

The configuration information, after the LU concatenation, is distributed, for example, to all the controller modules including the master controller module (S13).

Each of the controller modules refers to the configuration information to determine whether a logical unit, of which the given controller module is in charge, is moved to another controller module (S14).

Upon the logical unit, of which the given controller module is in charge, being moved to another controller module (YES in S14), the user shifts to operation S15 to transfer to a destination controller module only management information of cache data of the logical unit to be moved. Upon the logical unit of which the given controller module is in charge not being moved to another controller module, the user ends the process.

The cache data of the logical unit to be moved is moved to the destination controller module while accepting an I/O request from the user (S16).

In the LU concatenation state, the cache data of the logical unit to be moved is written back to the disk device, and only management information is moved to the destination controller module. When an I/O request from the host computer is received (or while a process of another I/O request is performed), the cache data of the logical unit to be moved is transferred to the destination. In this manner, in the LU concatenation state, the cache data of the source controller module need not be written back to the disk device. For this reason, the I/O request from the host computer can be avoided from being queued.

In this case, an example of configuration information held in the controller modules CM0 and CM1 will be described below with reference to FIGS. 3A and 3B.

Figure 3A:
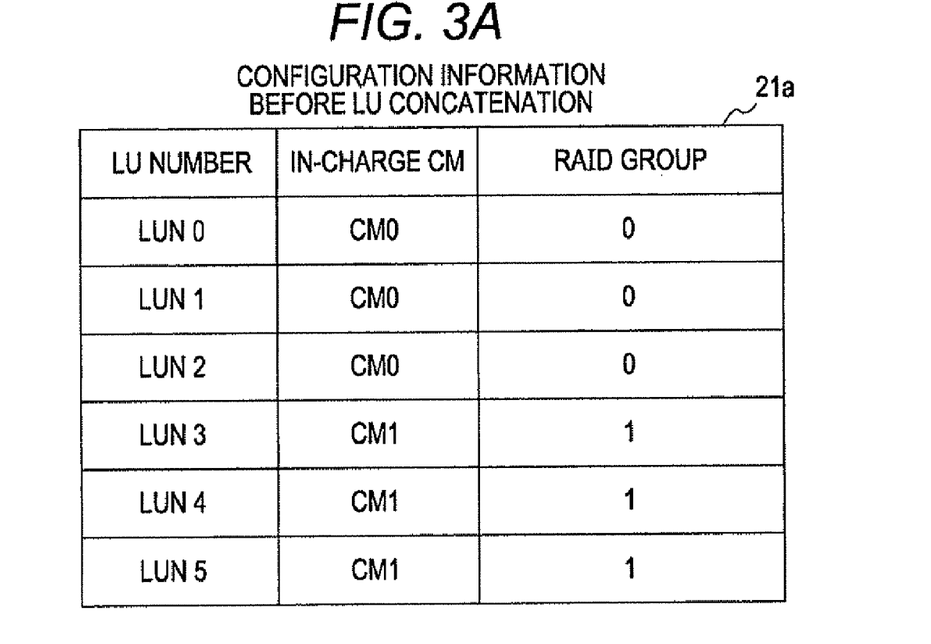
FIGS. 3A and 3B are diagrams illustrating configuration information before/after LU concatenation.
Figure 3B:
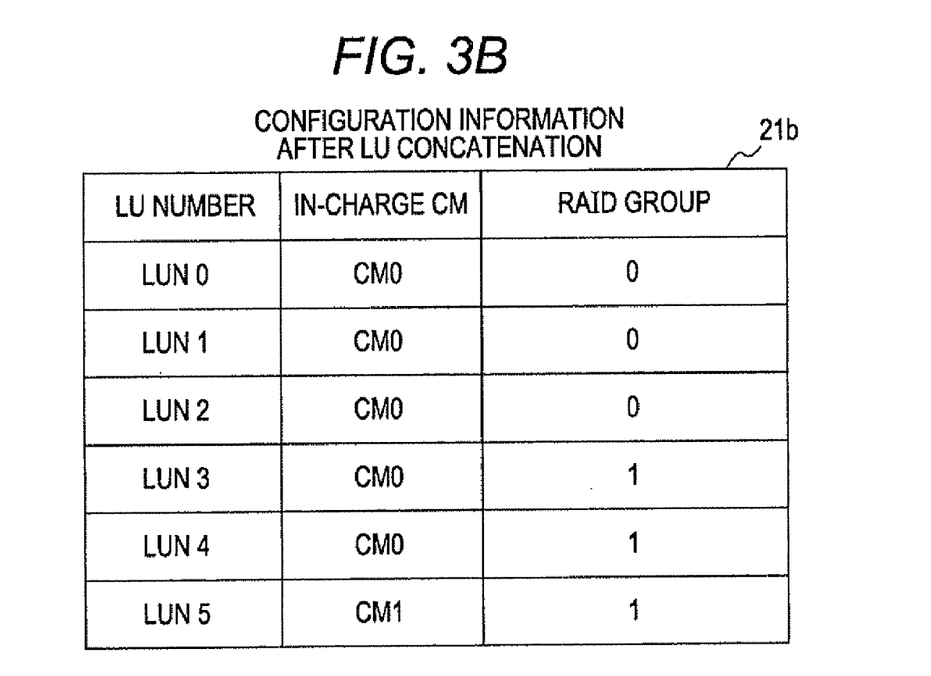

FIG. 3A illustrates configuration information 21a before LU concatenation, and FIG. 3B illustrates configuration information 21b after LU concatenation.

Each of the pieces of configuration information 21a and 21b includes pieces of information including one combination of a logical unit number, information (CM0 or CM1) representing a controller module being in charge of access to a logical unit, and information (RAID group 0 or RAID group 1) representing a RAID group to which the disk device belongs. The pieces of configuration information 21a and 21b are formed by a master control module (for example, CM0), and the formed configuration information is distributed to the respective controller modules. The controller modules CM0 or CM1 can discriminate a logical unit of which the given controller module is in charge from a RAID group to which the logical unit belongs with reference to the configuration information 21a or 21b.

The configuration information 21a before LU concatenation, as illustrated by FIG. 3A, the logic unit numbers LUN0, LUN1, and LUN2, information "CM0" representing a controller module which manages these logical units, and information "0" representing a RAID group are associated with one another. In addition, the logical unit numbers LUN3, LUN4, and LUN5, information "CM1" representing a controller module which manages these logical units, and information "1" representing a RAID group are associated with one another.

As is apparent from the configuration information 21a, before LU concatenation, the controller module CM0 is in charge of access to the logical units of the logical unit numbers LUN0 to LUN2, the controller module CM1 is in charge of access to the logical units of the logical unit numbers LUN3 to LUN5. It is also apparent that the logical units of the logical unit numbers LUN0 to LUN2 belong to the RAID group 0, and the logical units of the logical unit numbers LUN3 to LUN5 belong to the RAID group 1.

When the LU concatenation is executed, the master controller module forms the configuration information 21b after the LU concatenation illustrated in FIG. 3B.

In the configuration information 21b after the LU concatenation, the logical unit numbers LUN0 to LUN2, information "CM0" representing a controller module that manages these logical units, and information "0" representing a RAID group are associated with one another. The logical unit numbers LUN3 and LUN4, the information "CM0" representing a controller module which manages the logical units, and information "1" representing a RAID group are associated with one another. The logical unit number LUN5, information "CM1" representing a controller module which manages the logical unit, and information "1" representing a RAID group are associated with one another.

As is apparent from the configuration information 21b, after the LU concatenation, the controller module CM0 is in charge of access to the logical units of the logical unit numbers LUN0 to LUN4 while the controller module CM1 is in charge of access to the logical unit of the logical unit number LUN5. As is also apparent from the configuration information 21b, the logical units of the logical unit numbers LUN0 to LUN2 belong to RAID group 0, and the logical units of the logical unit numbers LUN3 to LUN5 belong to RAID group 1.

As a result of the LU concatenation, the controller module CM0 is in charge of access to the logical units of the logical unit numbers LUN3 and LUN4 of RAID group 1. Consequently, the disk device 13 of RAID group 1 is accessed by a plurality, e.g., two controller modules, i.e., the controller module CM1 which is originally in charge of the disk device 13 and the controller module CM0 serving as a destination of the logical unit.

Figure 4:
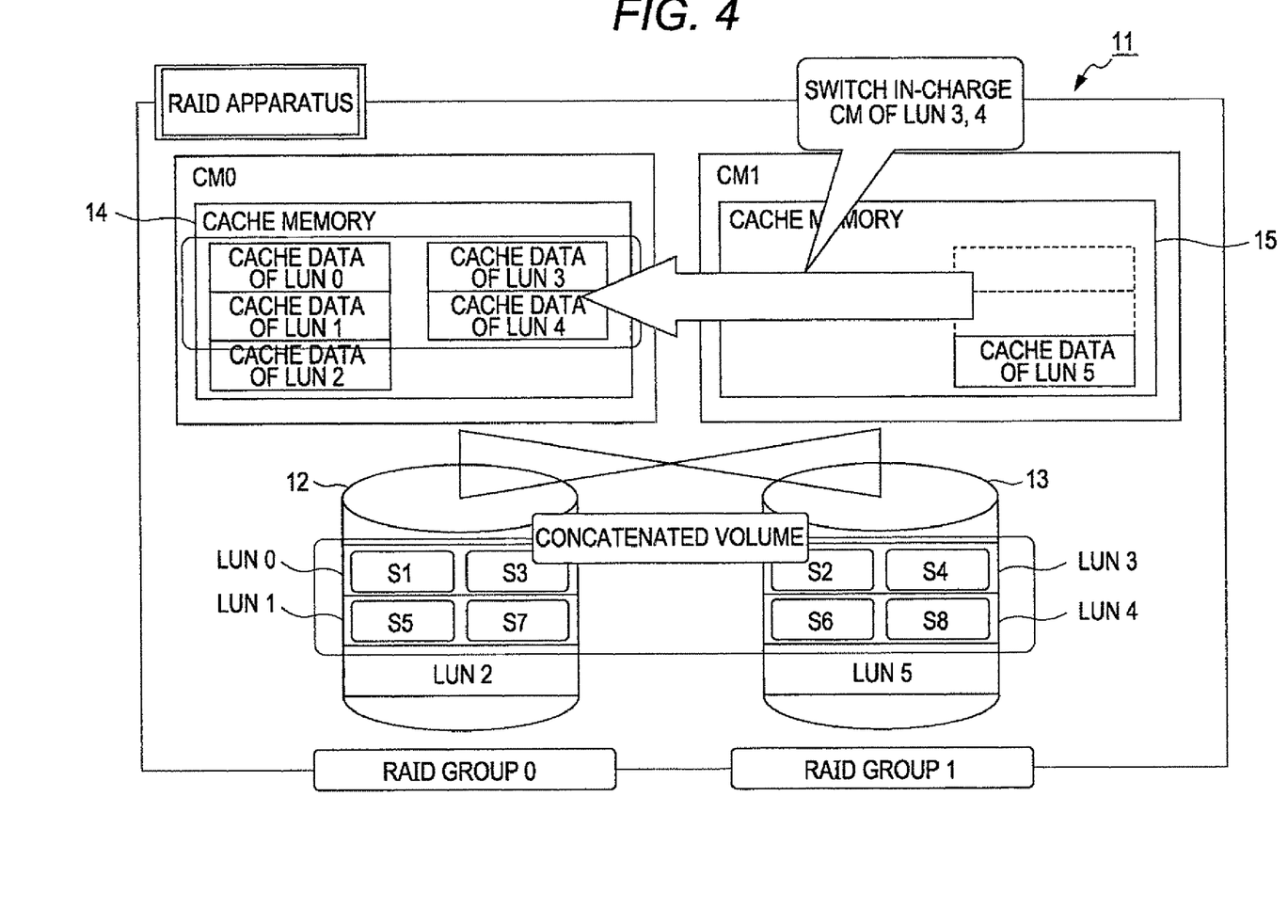
FIG. 4 is a diagram illustrating a switch of in-charge CMs in formation of stripe concatenated volume.

FIG. 4 is a diagram illustrating an example switch of in-charge controller modules in formation of stripe concatenated volume according to an embodiment of the present invention.

LU concatenation can be performed to concatenate the stripes S1 and S3 of the logical unit of the logical unit number LUN0 of the disk device 12 belonging to RAID group 0, the stripes S5 and S7 of the logical unit number LUN1, the stripes S2 and S4 of the logical unit number LUN3 of the disk device 13 belonging to RAID group 1, and stripes S6 and S8 of the logical unit number LUN4 to each other.

Upon the stripe concatenation being performed, the master controller module CM0 notifies the controller modules that the controller module that is in charge of the logical units of the logical unit numbers LUN3 and LUN4 is switched from the controller module CM1 to the controller module CM0.

This notification is performed by distributing the configuration information 21b after the LU concatenation shown in FIG. 3B to the controller modules. The methods for the notification to the controller modules include not only the method of distributing the constitution information but also a method of directly notifying the controller module from which the in-charge controller module is switched and the controller module to which the in-charge controller module is switched of the logical unit numbers of which the controller module is in charge.

When the in-charge controller module that is in charge of the logical units of the logical unit numbers LUN3 and LUN4 is switched to the controller module CM0, subsequently, the controller module CM0 acquires cache data of the logical units to store the cache data in the cache memory 14 of the controller module CM0.

Figure 5:
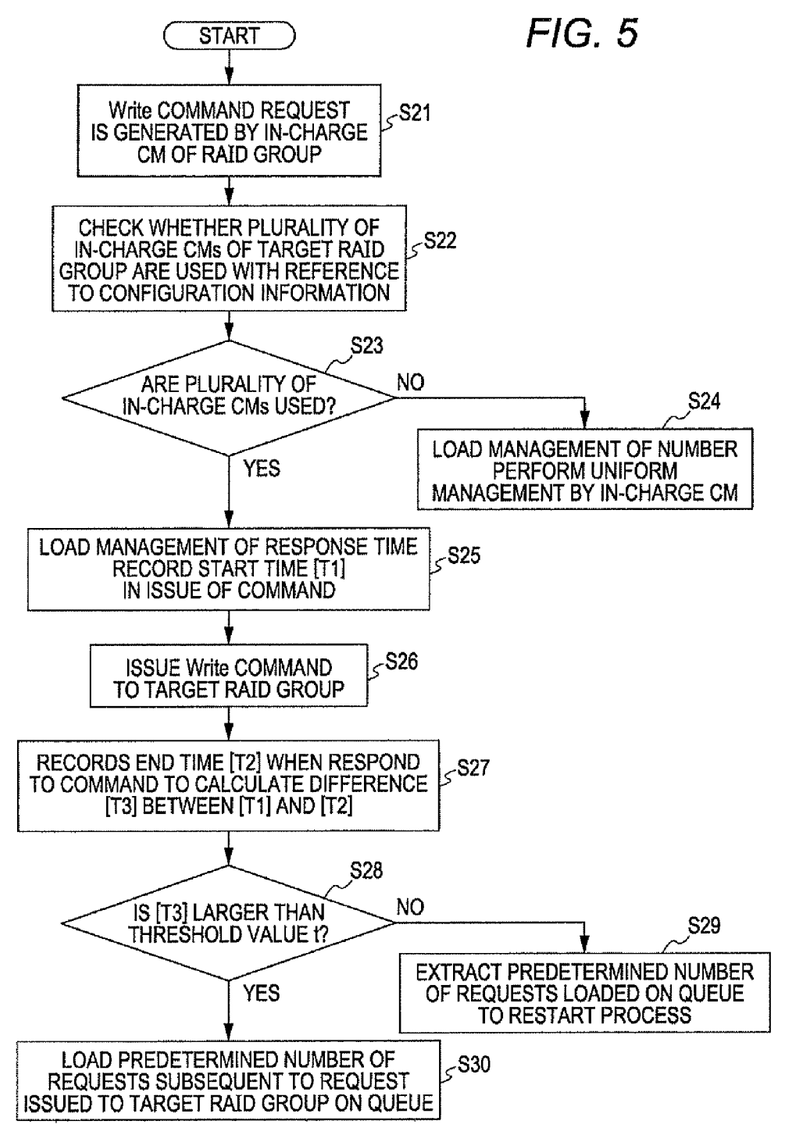
FIG. 5 is a flow chart illustrating a load management process after LU concatenation.

An example load management process performed after the LU concatenation is described below with reference to the flow chart illustrated in FIG. 5.

Upon each controller module detecting that a Write command request to a RAID group of which the controller module is in charge is generated (S21 in FIG. 5), the controller module checks, with reference to configuration information 21 (the configuration information 21a before the LU concatenation and the configuration information 21b after the LU concatenation are generally called the configuration information 21), whether a plurality of controller modules that are in charge of a RAID group to be accessed are present (S22). On the basis of the check result, it is determined whether the plurality of in-charge controller modules are present (S23).

Upon only one controller module that is in charge of a RAID group to be accessed being used (NO in S23), the computer shifts to operation S24 to perform load management to a disk device to be accessed by the number of accesses. This is because the in-charge controller module can uniformly perform the load management by the number of accesses since access from another controller module need not be considered when only one controller module that is in charge of the RAID group to be accessed is used.

Upon the plurality of in-charge parental controller modules being present (YES in S23), the computer shifts to operation S25 to record start time T1 at which a command is issued to perform load management of response time.

A Write command is issued to a disk device of the RAID group to be accessed (S26). End time T2 of command response of the RAID group to be accessed is recorded, and a difference T3 between time T1 and time T2 is calculated (S27).

It is determined whether or not the response time T3 is longer than a threshold value t (S28). Upon the response time T3 being smaller than the threshold value t (NO in S28), the computer shifts to operation S29 to extract a predetermined number of requests registered (loaded) in a queue and to execute the requests. Write or read requests from the host computer are sequentially registered in a queue, and some requests are sequentially executed after a predetermined period of time has elapsed in the order of registration.

Upon the response time T3 being longer than the threshold value t (YES in S28), a load on the RAID group to be accessed is large. For this reason, the computer shifts to operation S30 to register in a queue a predetermined number of requests subsequent to the RAID group to be accessed.

The load management process described above is described below with reference to FIG. 6.

Figure 6:
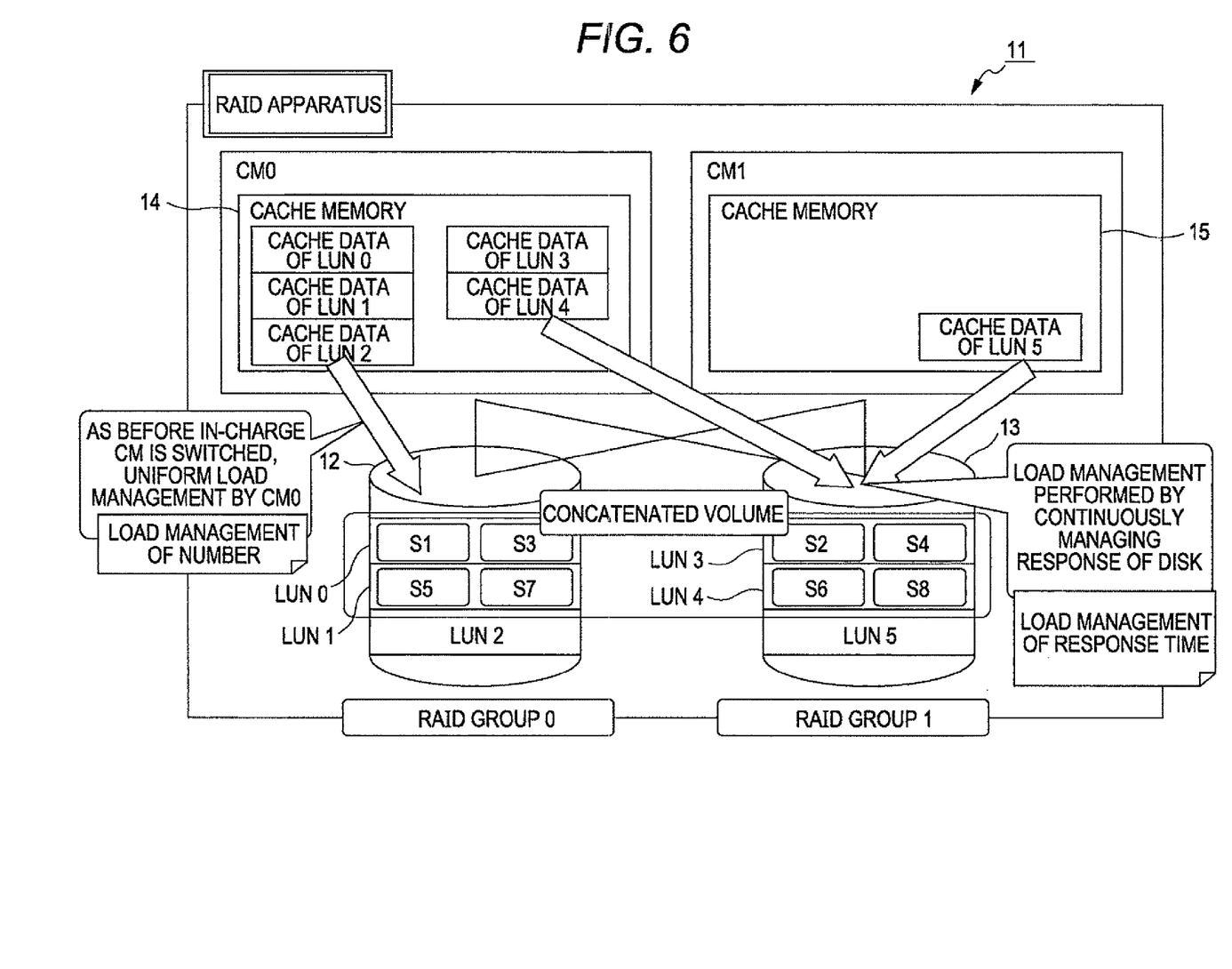
FIG. 6 is a diagram illustrating load management of numbers and load management of response time.

As a result of the LU concatenation, upon a controller module that is in charge of the logical units of the logical unit numbers LUN3 and LUN4 being present in RAID group 1 being switched from the controller module CM1 to the controller module CM0, data is written or read to/from the disk device 13 of RAID group 1 by the two controller modules, i.e., the controller module CM1 and the controller module CM0. For this reason, the disk device 13 of RAID group 1 cannot correctly recognize an amount of load from the number of accesses of the controller module CM1 which is originally in charge of the disk device 13. Therefore, the controller modules CM1 and CM0 calculate response times T3 for access to the disk device 13, respectively. When the response time T3 is longer than the threshold value t, the computer determines that the load on the disk device 13 is large to regulate access to the disk device 13.

With respect to the disk device 12 of RAID group 0, an in-charge controller module is only the controller module CM0. Thus, as in the LU concatenation, the controller module CM0 uniformly performs load management by the number of accesses.

According to the load management process described above, even though a plurality of controller modules are in charge of access to one disk device by LU concatenation, a load on the disk device can be appropriately managed.

Figure 7:
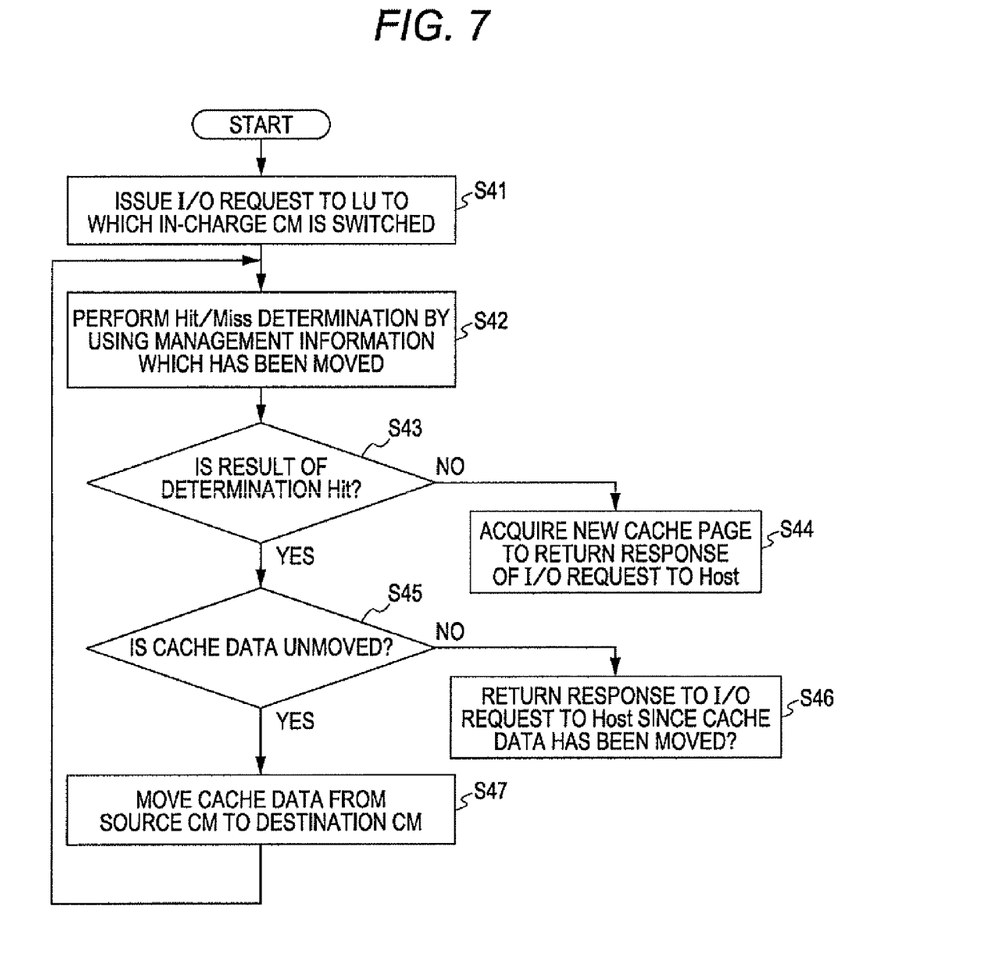
FIG. 7 is a flow chart illustrating a moving process of cache data in I/O request.

FIG. 7 is a flow chart of an example process of moving cache data in an I/O request state.

Upon an I/O request to a logical unit the controller modules of which are switched is generated (S41 in FIG. 7), it is determined whether the request is a cache hit or a cache miss by using moved management information (S42). When LU concatenation is performed to switch in-charge controller modules, management information including a logical unit number and position information of data such as a logical block address (LBA) is transferred from a source controller module to a destination controller module. Therefore, even though the destination controller module does not hold cache data of the moved logical unit in the cache memory of the controller module, it can be determined whether the cache hit is a cache hit from the host computer to an I/O request or a cache miss with reference to the management information.

It is determined whether the determination result is a cache hit (S43). Upon a cache miss being determined (NO in S43), i.e., when no cache data is preset in neither of the cache memory of the destination controller module and the cache memory of the source controller module, the computer shifts to operation S44 to newly acquire a cache page. After a process to an I/O process is performed, a response to the I/O request is returned to the host computer.

On the other hand, upon the request being determined as a cache hit (YES in S43), the computer shifts to operation S45 to determine whether or not cache data of the corresponding logical unit has been moved.

When the cache data has been moved (NO in S45), the computer shifts to operation S46 to perform the process to the I/O request by using the cache data stored in the cache memory of the destination controller module. Thereafter, a response to the I/O request is returned to the host computer.

On the other hand, when the cache data has not been moved (YES in S45), the computer shifts to operation S47 to request the source controller module to transfer cache data of a logical unit requested to be I/O to store the cache data to be transferred in the cache memory of the destination controller module. Cache data that are not requested to be I/O in the logical unit moved by the LU concatenation are sequentially moved while accepting I/O requests of the other cache data.

In the cache data moving process described above, cache data is not moved when controller modules which are in charge of access to a logical unit are switched, only management information is moved to the destination controller module. When the I/O request to the logical unit the in-charge controller modules of which are switched is generated, it is determined with reference to the management information whether the request is a cache hit or a cache miss. When the cache hit is determined and when the cache data is not moved (a state in which the cache data is present in the cache memory of the source controller module), the source controller module is requested to transfer the cache data, and the cache data to be transferred is stored in the cache memory of the destination controller module.

In the embodiment described above, when an I/O request is generated to the moved logical unit or when another I/O request is accepted, necessary cache data are sequentially transferred from a source controller module to a destination controller module. In this manner, in concatenation of a logical unit, cache data in the source controller module need not be temporarily written back to a disk device to set a Write Through mode, and the in-charge controller modules need not be switched. For this reason, meanwhile, an I/O request from the host computer is not queued.

Even in stripe concatenation which concatenates data distributed to and arranged on different disk devices, one controller module is in charge of the concatenated logical units to make it possible to reduce an amount of communication between the controller modules.

The present invention is not limited to the above example embodiments. For example, the present invention includes the following example configurations. Although the above described example embodiment describes a case in which two controller modules, e.g., CM0 and CM1 are in charge of disk devices of RAID group 0 and RAID group 1, respectively the number of controller modules is not limited to two, and an arbitrary number (two or more) of controller modules may be used. As another example, disk devices, for example disk devices 12 and 13 and controller modules, for example the controller modules CM0 and CM1. included in a RAID apparatus (RAID control apparatus) may be arranged at distant positions e.g, being far from each other through a network.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A RAID control apparatus comprising:
a plurality of disk devices; and
a plurality of disk control devices,
wherein each of the disk control devices includes a cache memory that stores cache data of a logical unit and at least one of the disk control devices accesses a plurality of logical units in different disk devices of the plurality of disk devices being concatenated to each other, transfers management information of the cache data of the logical unit to be moved to another one of the plurality of disk control devices that is in charge of access to the plurality of concatenated logical units when a logical unit, of which one of the plurality of disk control devices is in charge, is moved to the another one of the plurality of disk control devices is in charge, is moved to the another one of the plurality of disk control devices, and transfers the cache data of the logical unit to be moved from the disk control device to the another disk control device when an I/O request is received from a host computer, without writing back the cache data stored in a cache memory of the disk control device that controls a source disk of the plurality of disk devices, to the source disk device.

2. The RAID control apparatus according to claim 1, wherein
each of the disk control devices includes a cache data acquiring unit, upon access to the logical unit of which the one of the plurality of disk control devices is in charge being requested, to determine whether the cache data of the logical unit has been moved and, when the cache data has not been moved, acquiring the cache data of the logical unit from the disk control device that controls the source disk.

3. The RAID control apparatus according to claim 1, wherein each of the disk control devices comprises:
a determination unit to determine whether a plurality of disk control devices that are in charge of access to the disk devices having the concatenated logical units are present; and
a load management unit, upon it being determined that the plurality of disk control devices are present, to calculate a response time of the disk control device to a write or read request to perform load management of the disk device on the basis of the response time.

4. The RAID control apparatus according to claim 1, wherein each of the disk control devices comprises:
a determination unit to determine whether the plurality of disk control devices that are in charge of access to a disk device of the plurality of disk devices having logical units of the plurality of logical units that are to be concatenated are present; and
a load management unit, upon it being determined that the plurality of disk control devices are present, to calculate a response time of the disk device to a write or read request to perform load management of the disk device on the basis of the response time and, upon it being determined that a number of disk control devices in charge of access to the disk device is one, performing load management of the disk device on a basis of a number of accesses for writing or reading to the disk device.

5. The RAID control apparatus according to anyone of claim 1, claim 2, or claim 3, wherein each of the disk control devices comprises:
a management information acquiring unit to acquire management information related to the logical unit moved from the disk control device that controls the source disk; and
a determination unit, upon an access request to the logical unit being generated, to determine with reference to the management information whether a request is a cache hit or a cache miss.

6. The RAID control apparatus according to anyone of claim 1, claim 2, or claim 3, wherein each of the disk control devices includes an acquiring unit to acquire configuration information in which the logical unit, information representing the disk device having the logical unit, and information representing the disk control device which is in charge of access to the logical unit are associated with one another.

7. The RAID according to claim 6, wherein a master disk control device in the plurality of disk control devices includes:
a creating unit to create configuration information in which, when the plurality of logical units are concatenated to each other, logical units of the plurality of logical units to be concatenated to each other, information representing the disk device having the logical units, and information representing the disk control device which is in charge of access to the logical unit; and a distribution unit to distribute the created configuration information to the disk control devices.

8. A control method for a RAID control apparatus comprising a plurality of disk devices and a plurality of disk control devices one of which has an in-charge status, the method comprising:

upon a plurality of logical units in different disk devices of the plurality of disk devices being concatenated to each other, transferring the in-charge status from the one of the disk control devices to another of the plurality of disk control devices so that the another one of the plurality of disk control devices is in charge of access to the plurality of concatenated logical units without writing back cache data stored in a cache memory of the disk control device that controls a source disk of the plurality of disk devices, to the source disk device.

9. The control method for a RAID control apparatus according to claim 8, comprising:

upon access to the logical unit of the plurality of logical units of which the disk control device is in charge being requested, determining whether the cache data of the logical unit of the plurality of logical units has been moved; and upon the cache data not having been moved, acquiring the cache data of the logical unit from the disk control device that controls the source disk.

10. The control method for a RAID control apparatus according to claim 8, comprising:

determining whether a plurality of disk control devices that are in charge of access to the disk devices having logical units that are to be concatenated are present;

upon it being determined that the plurality of disk control devices are present, calculating response time of the disk device to a write or read request;

performing load management of the disk device on the basis of the response time; and upon it being determined that the number of disk control devices being in charge of access to the disk device is one, performing load management of the disk device on the basis of the number of accesses for writing or reading to the disk device.

11. The control method for a RAID control apparatus according to claim 8, comprising:

upon the plurality of logical units being concatenated to each other, acquiring management information related to a logical unit moved from the source disk control device; and upon an access request to the logical unit being generated, determining with reference to the management information whether the request is a cache hit or a cache miss.

* * * * *